Patented Dec. 26, 1939

2,184,494

UNITED STATES PATENT OFFICE 2,184,494

MANUFACTURE OF GELATIN

John Vernon Stuart Glass, Sutton Weaver, near Warrington, England, assignor to Imperial Chemical Industries Limited, a corporation of Great Britain No Drawing. Application August 19, 1937, Serial No. 159,995. In Great Britain August 27, 1936

13 Claims. (Cl. 260—118)

This invention relates to improvements in the manufacture of gelatin.

It is an object of this invention to improve the manufacture of gelatin. A further object is to reduce the time of the liming step in the manufacture of high grade gelatin. A still further object is to eliminate excessive supervision and control in the liming step of making gelatin. Other objects will appear hereinafter.

One step in the manufacture of high grade gelatin from osseine and similar equivalent materials is the treatment of the latter with a suspension of lime at ordinary temperatures for periods of up to two or three months. Such a treatment possesses obvious disadvantages on account of its prolonged nature, entailing considerable labor and supervision with consequent high cost and a comparatively large plant for a given output. Moreover, the gelatin-forming material is subjected to the hydrolyzing influence of the alkali throughout the treatment, and in consequence the maximum yield of gelatin is not obtained. Various proposals have been made to hasten the process or to replace it by another more rapid process, though none of them appears to give such a good quality gelatin as the normal liming process. Thus, it has been proposed to add caustic soda to the lime and to treat the raw materials with proteolytic enzymes, or with peroxides, e. g. sodium peroxide, and chlorine dioxide.

I have now found that a considerable acceleration of the liming process can be achieved without detracting from the quality of the resultant high grade gelatin by adding to the lime suspension a small proportion of a primary or secondary amine. More particularly useful are those amines containing not more than five carbon atoms and no negative grouping. In other respects the process is performed in the usual manner, though on account of the accelerating effect of the added amine the time for which the treatment has to be continued may be lessened by as much as 50%, depending on the particular amine employed and the amount added.

Examples of suitable compounds are methylamine, dimethylamine, ethylamine, n-propylamine, ethylmethyl amine, n-butylamine, guanidine, ethylene diamine, hydrazine, hydroxylamine, and ring compounds such as piperidine and piperazine may also be used.

The amount of amine to be added is usually of the order of 0.01% to 0.1% on the liquor. Greater quantities, e. g. 0.5% may also be added, although I do not find that the effect produced is very much greater than when only 0.1% is employed.

The following examples illustrate but do not limit my invention.

Example I

A batch of osseine was treated at 15° C. for four weeks with a lime suspension containing 0.1% methylamine, the suspension being changed several times during this interval. The osseine was then washed in the customary manner and extracted with water at 60° C. when 40% of the osseine was hydrolyzed in 3.7 hours and gave a gelatin having excellent clarity, color and jelly strength. A similar batch of osseine treated with lime suspension alone required seven weeks treatment before the osseine was as soluble and gave as good a gelatin. The extraction may be carried out at higher temperatures with consequent greater yields if desired.

Example II

A batch of osseine was treated for four weeks at 15° C. with a lime suspension containing 0.1% piperidine. After washing, the osseine was extracted with water at 60° C. when 40% of the osseine hydrolyzed in 4.2 hours and gave a good quality gelatin. A control batch treated with lime alone required treatment for seven weeks before the osseine was as soluble. The gelatin then produced was similar to that obtained from the osseine which had been subjected to the action of a lime suspension containing piperidine.

Example III

A batch of osseine was treated at 15° C. for four weeks with a lime suspension containing 0.1% dimethylamine. The material then gave excellent gelatin, whilst a control sample of osseine, treated in lime alone required 50 days' treatment before the osseine was as soluble and gave as good a gelatin.

Example IV

A batch of osseine was treated at 15° C. for 27 days with a lime suspension containing 0.1% piperazine. It attained the same degree of solubility after this period as a control sample matured in lime alone for 41 days.

In place of the specific amines of the above examples can be substituted practically any amine belonging to the cited classes. Thus aliphatic and heterocyclic amines, simple or mixed amines can be used. Amines which contain a plurality of primary or secondary amino groups may be used. The amines may normally be gaseous or liquid and are preferably easily water-soluble or miscible. The non-toxic simple aliphatic primary or secondary amines are preferred when the gelatin is to be used for edible purposes.

As many apparently widely different embodiments of this invention may be made without departing from the spirit and scope thereof it is to be understood that I do not limit myself to the specific embodiments thereof except as defined in the appended claims.

I claim:

1. In the process of making gelatin from gelatin-forming materials by treatment with a lime suspension the improvement which comprises adding a non-tertiary amine containing no negative group to the lime suspension.

2. In the process of making gelatin from gelatin-forming materials of animal nature by treatment with a lime suspension the improvement which comprises adding from 0.01% to 0.5% of a non-tertiary amine containing no negative group to the lime suspension.

3. The process which comprises treating osseine with a lime suspension containing from 0.01% to 0.1% of a non-tertiary amine containing no negative group.

4. The process of claim 3 in which the non-tertiary amine is an aliphatic amine.

5. The process of claim 3 in which the nontertiary amine is a heterocyclic amine.

6. In the liming step in the manufacture of gelatin, the improvement which consists in adding a small amount of non-tertiary amine containing no negative group to the lime suspension.

7. The process for the production of gelatin which includes the step of treating osseine of animal origin with a lime suspension containing a non-tertiary amine having less than 5 carbon atoms and containing no negative group.

8. The process for the production of gelatin which includes the step of treating osseine with a lime suspension containing from 0.01% to 0.5% of a non-tertiary amine having less than 5 carbon atoms and containing no negative group.

9. The process for the production of gelatin which includes the step of treating osseine with a lime suspension containing from 0.01% to 0.1% of a non-tertiary amine having less than 5 carbon atoms and containing no negative group.

10. The process of claim 7 in which the lime-amine suspension is changed during the treatment.

11. The process of claim 7 wherein the amine is methylamine.

12. The process of claim 7 wherein the amine is piperidine.

13. The process of claim 7 wherein the amine is dimethylamine.

JOHN VERNON STUART GLASS.